United States Patent [19]
Takezawa

[11] Patent Number: 5,627,683
[45] Date of Patent: May 6, 1997

[54] LENS BARREL HAVING A BIASING MEMBER TO PREVENT BACKLASH BETWEEN LENS UNIT CAM MECHANISMS

[75] Inventor: Kazumitsu Takezawa, Yokohama, Japan

[73] Assignee: Nikon Corporation, Tokyo, Japan

[21] Appl. No.: 571,762

[22] Filed: Dec. 13, 1995

[30] Foreign Application Priority Data

Apr. 26, 1995 [JP] Japan .................................. 7-101849

[51] Int. Cl.$^6$ ........................................... G02B 15/14
[52] U.S. Cl. ............................ 359/700; 359/703; 359/704
[58] Field of Search ......................... 359/700, 699, 359/823, 703, 704, 701; 354/195.12, 400

[56] References Cited

U.S. PATENT DOCUMENTS

| | | | |
|---|---|---|---|
| 3,506,338 | 4/1970 | Holderbaum | 359/700 |
| 4,255,020 | 3/1981 | Yukio | 359/705 |
| 4,764,784 | 8/1988 | Torikoshi | 354/195.12 |
| 4,950,061 | 8/1990 | Tsurukawa | 359/696 |
| 4,974,949 | 12/1990 | Tanaka | 359/704 |
| 5,037,187 | 8/1991 | Oda | 359/699 |
| 5,485,315 | 1/1996 | Nomura | 359/701 |
| 5,488,513 | 1/1996 | Tanaka | 359/699 |
| 5,515,205 | 5/1996 | Yokoyama | 359/699 |

*Primary Examiner*—Georgia Y. Epps
*Assistant Examiner*—Rickey Mack

[57] ABSTRACT

A lens barrel which has a lens holding member for holding a lens unit, a movement cam mechanism for moving the lens holding member in an optical-axis direction, a biasing member for biasing the lens holding member to shift a slide allowance of the movement cam mechanism in one direction, a biasing force receiving member for receiving a biasing force of the biasing member and a biasing force adjustment cam mechanism for moving the biasing force receiving member in the optical-axis direction so that the biasing force of the biasing member remains the same.

6 Claims, 4 Drawing Sheets

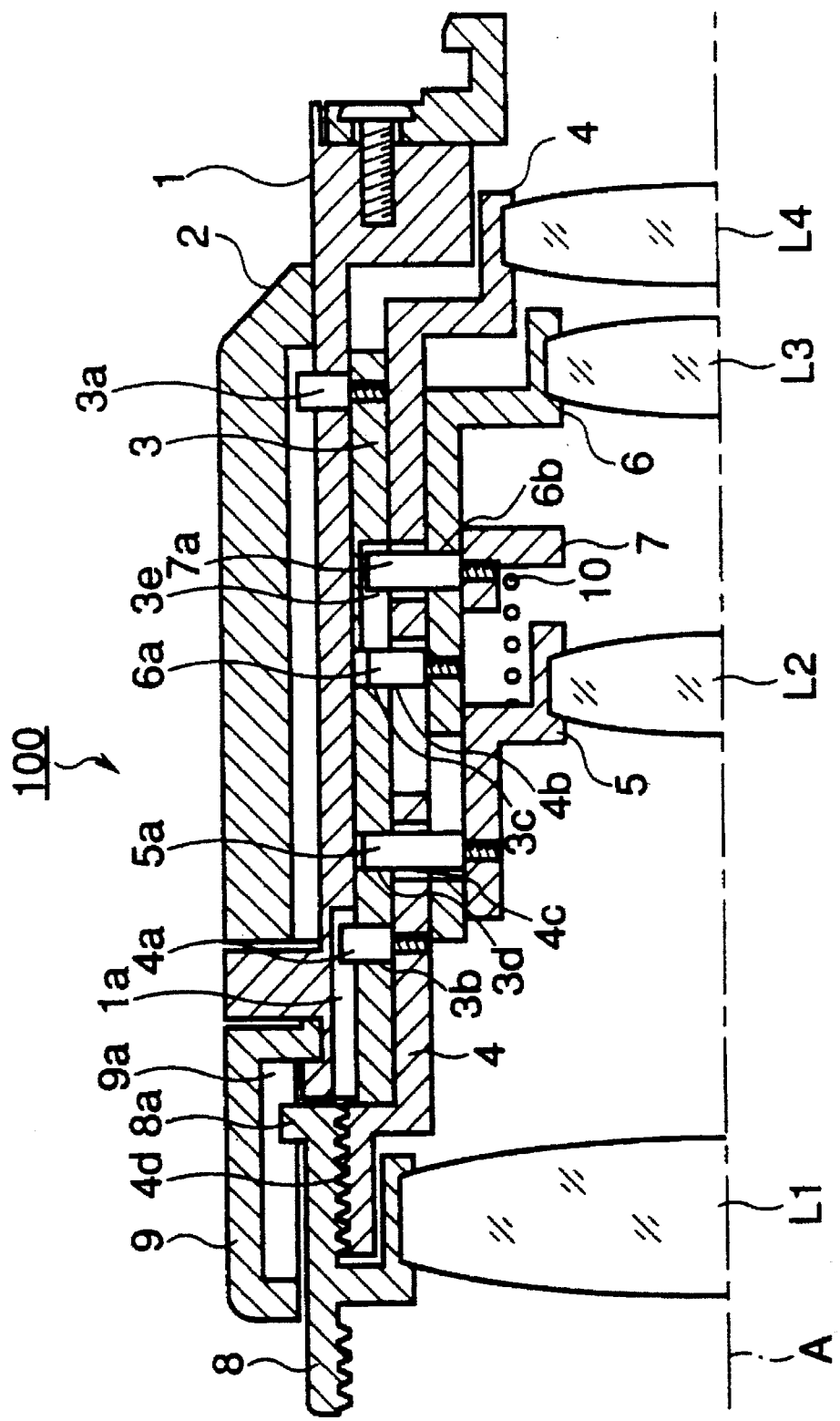

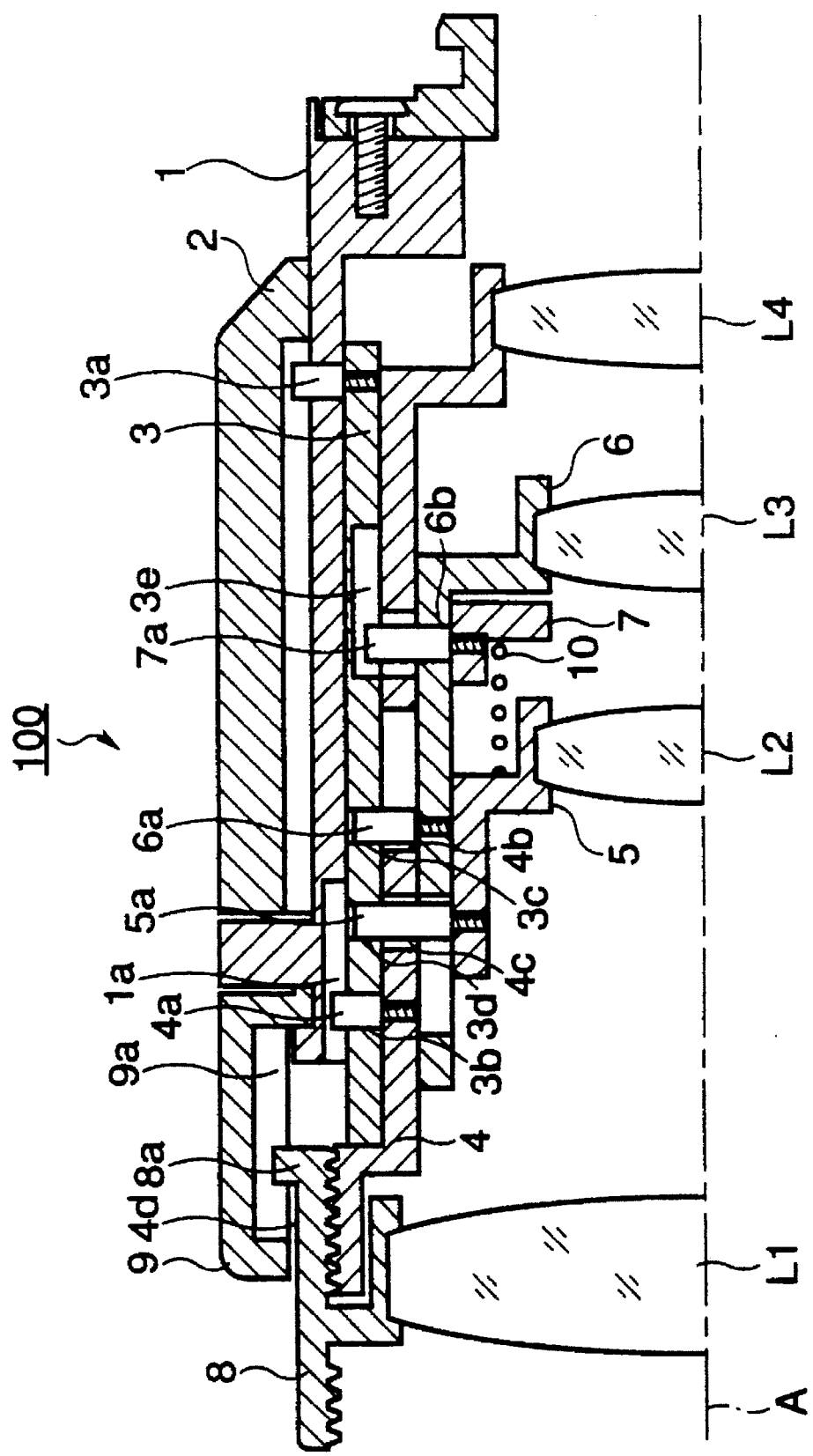

LENS BARREL HAVING A BIASING MEMBER TO PREVENT BACKLASH BETWEEN LENS UNIT CAM MECHANISMS

BACKGROUND OF THE INVENTION

1. Field of the Invention

The present invention relates generally to a lens barrel and, more particularly, to a lens barrel capable of preventing a backlash or play between movement cam mechanisms for moving lens units.

2. Related Background Art

This type of lens barrel has hitherto incorporated a plurality of lens units each performing a different operation, e.g., a second lens unit L2 and a third lens unit L3 that are illustrated in FIGS. 1 and 2. The lens units L2, L3 are individually held by unit lens drums 5, 6 fitted to a fixed drum 1 of the lens barrel. The individual unit lens drums 5, 6 are provided with pins 5a, 6a which are fitted in grooves 4c, 4b, whereby the movement cam mechanism is constructed.

Accordingly, the construction is such that referring to, e.g., FIG. 1, when zoomed by rotating a cam ring 3, with a work of the above movement cam mechanism, the respective lens units L2, L3 are moved along an optical axis A as illustrated in FIG. 2, and a variety of functions are performed. In this case, providing the individual pins 5a, 6a with smooth shifts within the respective grooves 4c, 4b involves forming predetermined play air gaps (slide allowances) between the pins 5a, 6a and the grooves 4c, 4b.

If those components remain as they are, however, this may cause a "backlash" of the movement cam mechanism members, and, therefore, a biasing member 10 such as a helical spring is provided between the respective lens units L2 and L3 in this type of lens barrel 200. This biasing member 10 biases the lens units L2, L3 respectively in the optical-axis direction A, with the result that the pins 5a, 6a are pushed against one sides of the grooves 4c, 4b. A backlash in the movement cam mechanism is thereby prevented.

In the above conventional lens barrel 200, however, an interval between the lens units L2 and L3 varies, and, because of variations in value of the biasing force of the biasing member 10 acting therebetween, there arises such a problem that an inconstant cam operation is done when performing a zooming or focusing process.

SUMMARY OF THE INVENTION

It is a primary object of the present invention to provide a lens barrel constructed to keep a biasing force of a biasing member constant for preventing a backlash even in any operating time such as zooming or focusing.

For accomplishing the above object, according to the one embodiment of the present invention, a lens barrel comprises a lens holding member for holding a lens unit, a movement cam mechanism for moving the lens holding member in an optical-axis direction, a biasing member for biasing the lens holding member so as to shift a slide allowance of the movement cam mechanism in one direction, a biasing force receiving member for receiving a biasing force of the biasing member and a biasing force adjustment cam mechanism for moving the biasing force receiving member in the optical-axis direction so that the biasing force of the biasing member remains the same.

In accordance with the embodiment having the above construction, when the movement cam mechanism moves the lens holding member, the biasing force adjustment cam mechanism moves the biasing force receiving member in the optical-axis direction to keep the biasing force of the biasing member constant, and, therefore, the movement cam mechanism is biased by the constant biasing force.

According to another embodiment of the present invention, a lens barrel comprises a first lens holding member for holding a first lens unit, a second lens holding member for holding a second lens unit, a first movement cam mechanism for moving the first lens holding member in an optical-axis direction, a second movement cam mechanism for moving the second lens holding member in the optical-axis direction and a biasing member for biasing the first and second lens holding members so as to shift slide allowances of the first and second movement cam mechanisms. This lens barrel further comprises a biasing force receiving member, provided in one of the first and second lens holding members, for receiving a biasing force of the biasing member and a biasing force adjustment cam mechanism for moving the biasing force receiving member in the optical-axis direction so that the biasing force of the biasing member remains the same.

In accordance with the above embodiment, if the first movement cam mechanism moves the first lens holding member while the second movement cam mechanism moves the second lens holding member, the biasing force adjustment cam mechanism moves the biasing force receiving member in the optical-axis direction to keep the biasing force of the biasing member constant. Hence, the first and second movement cam mechanisms are biased by the constant biasing force.

BRIEF DESCRIPTION OF THE DRAWINGS

Other objects and advantages of the present invention will become apparent during the following discussion in conjunction with the accompanying drawings, in which:

FIG. 3 is a vertical sectional view illustrating a configuration of a single-lens reflex camera interchangeable lens in one embodiment of the present invention; and FIG. 4 is a vertical sectional view illustrating a configuration of the single-lens reflex camera interchangeable lens shown in FIG. 3 when zoomed.

DESCRIPTION OF THE PREFERRED EMBODIMENTS

Figure 1:
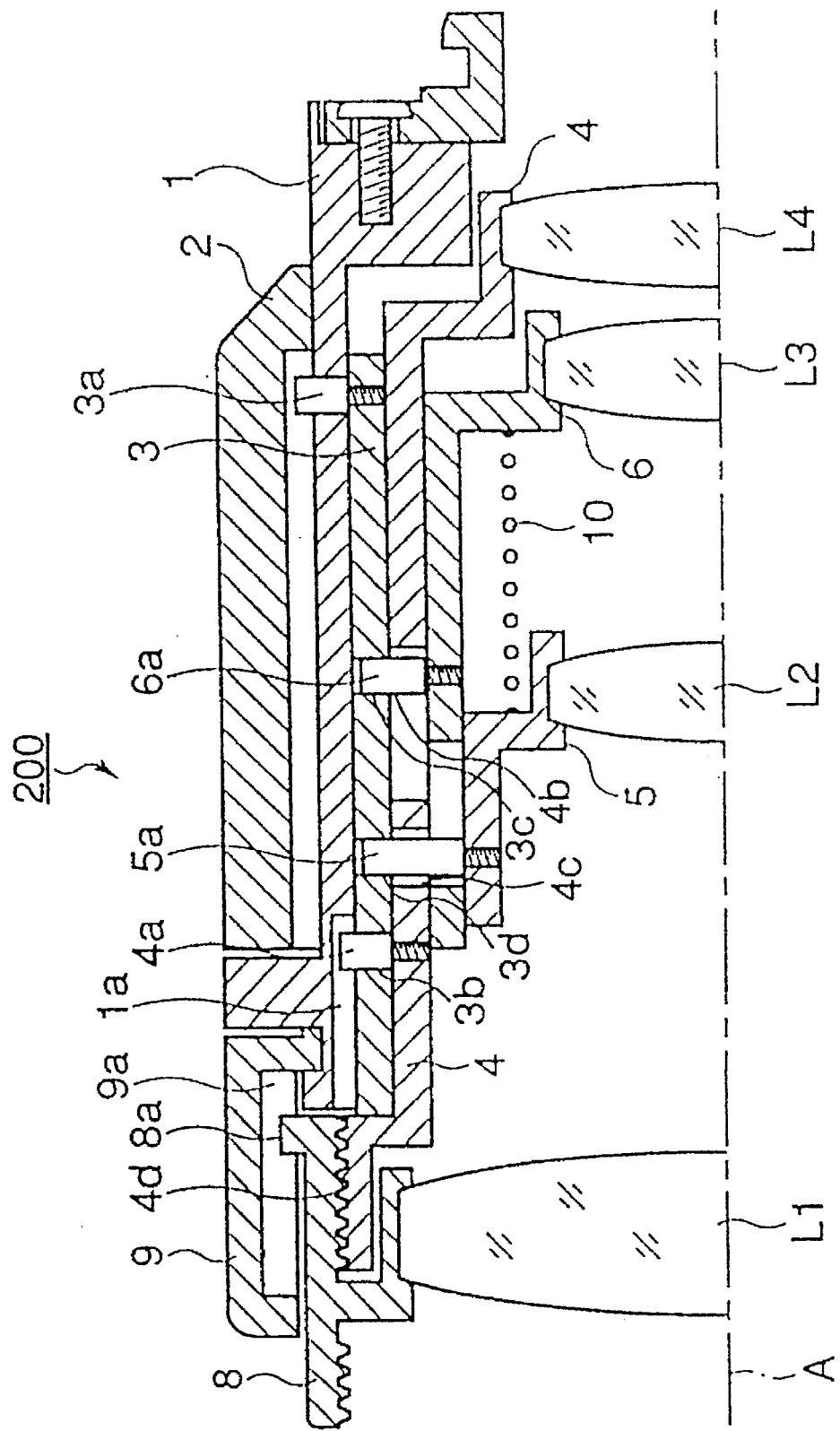
FIG. 1 is a sectional view illustrating a configuration of an interchangeable lens for a single-lens reflex camera in a conventional example.
Figure 2:
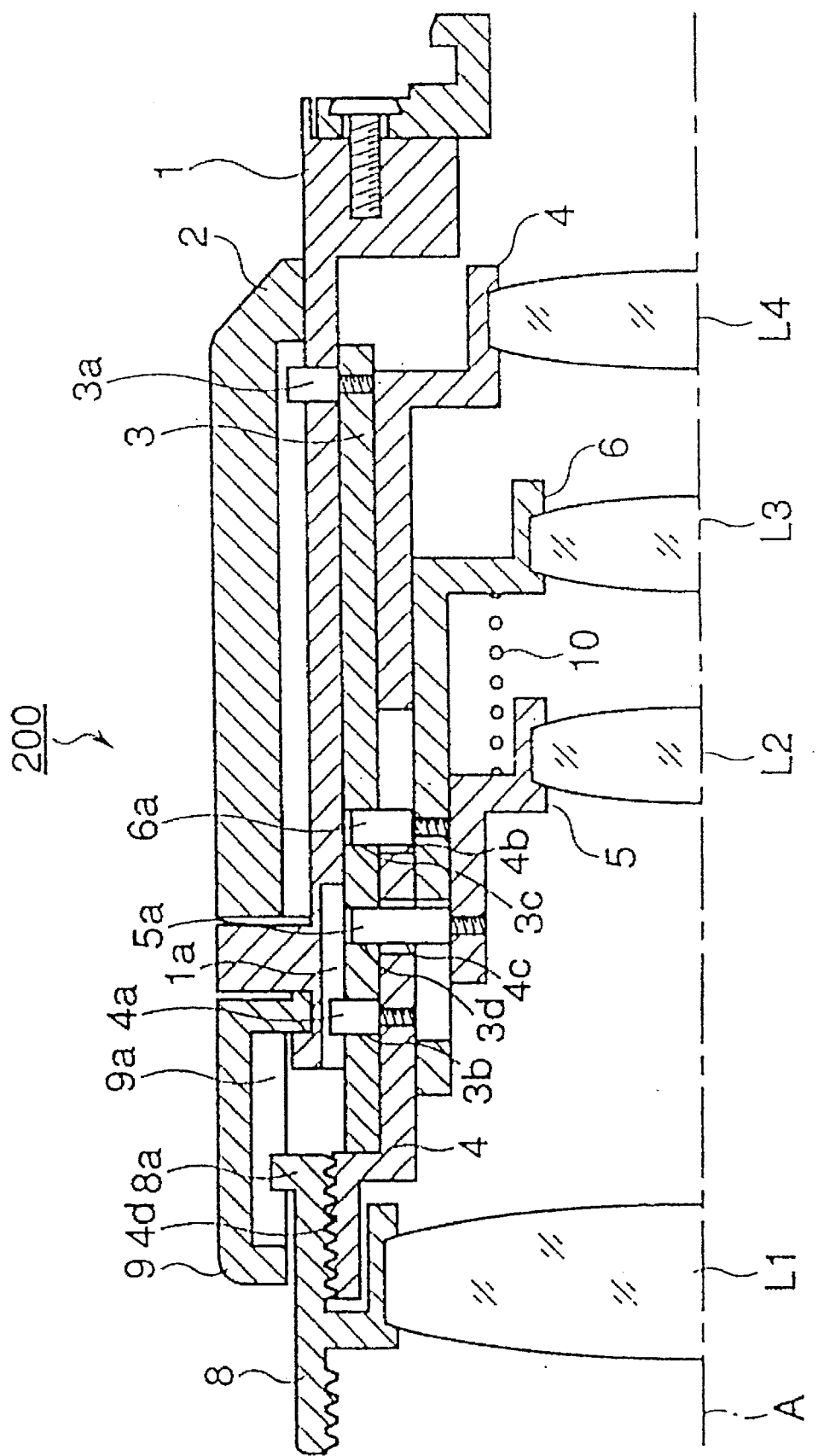
FIG. 2 is a vertical sectional view illustrating a configuration of the single-lens reflex camera interchangeable lens shown in FIG. 1 when zoomed.

The present invention will hereinafter be discussed in detail by way of embodiments with reference to the accompanying drawings.

FIG. 3 is a vertical sectional view illustrating a configuration of an interchangeable lens for a single-lens reflex camera in accordance with one embodiment of a lens barrel of the present invention. As illustrated in FIG. 3, this interchangeable lens 100 for the single-lens reflex camera includes a fixed drum 1 and first through fourth lens units L1, L2, L3, L4 that are disposed forward in the interior of this fixed drum 1.

A zoom operation ring 2 is so mounted onto an outer periphery of the fixed drum 1 as to be rotatable about the optical axis A. A cam ring 3 is so mounted onto an inner periphery of the fixed drum 1 as to be rotatable about the optical axis A. A zoom interlocking pin 3a is fitted to the cam ring 3, whereby a rotation of the zoom operation ring 2 is transferred to the cam ring 3.

A four-unit lens drum 4 for holding the fourth lens unit L4 is so provided along an inner periphery of the cam ring 3 as to be slidable thereon. The cam ring 3 is formed with a cam groove 3b, while the fixed drum 1 is formed with a rectilinear groove 1a. Four-unit interlocking pins 4a fitted in the two grooves 3b, 1a are attached to the four-unit lens drum 4. Accordingly, when the cam ring 3 rotates, the four-unit lens drum 4 moves rectilinearly along the optical axis A.

A three-unit lens drum 6 is so provided along an inner periphery of the four-unit lens drum 4 as to be slidable thereon. The cam ring 3 is formed with a cam groove 3c, while the four-unit lens drum 4 is formed with a rectilinear groove 4b. Three-unit interlocking pins 6a fitted in the two grooves 3c, 4b are attached to the three-unit lens drum 6. Accordingly, when the cam ring 3 rotates, the three-unit lens drum 6 moves rectilinearly along the optical axis A.

A two-unit lens drum 5 is so provided along an inner periphery of the three-unit lens drum 6 as to be slidable thereon. The cam ring 3 is formed with a cam groove 3d, while the four-unit lens drum 4 is formed with a rectilinear groove 4c. Two-unit interlocking pins 5a fitted in the two grooves 3d, 4c are attached to the two-unit lens drum 5. Accordingly, when the cam ring 3 rotates, the two-unit lens drum 5 moves rectilinearly along the optical axis A.

A spring receiving member 7 is so provided along an inner periphery of a three-unit lens barrel 6. The above cam ring 3 is formed with a rectilinear groove 3e, while the three-unit lens drum 6 is formed with a cam groove 6b. Spring receptible interlocking pins 7a fitted into the two grooves 3e, 6b are attached to the spring receiving member 7. Hence, when the cam ring 3 rotates, the spring receiving member 7 moves along the optical axis A while rotating.

The cam groove 6b formed in the three-unit lens drum 6 takes such a shape that the spring receiving member 7 makes the same motion as the two-unit lens drum 5. That is, the cam groove 6b and the spring receptible interlocking pin 7a serve as a cam for compensating a difference in moving quantity between the second and third lens units L2, L3.

A helical spring 10 is disposed between the two-unit lens drum 5 and the spring receiving member 7. The helical spring 10 is disposed as a compression spring and works to bias the two-unit lens drum 5 and the spring receiving member 7 in direction opposite to each other. The spring receiving member 7 transfers the biasing force of the helical spring 10 to the three-unit lens drum 6 with the aid of the cam groove 6b, thereby preventing a backlash or play of the three-unit lens drum 6 in the cam groove 3c.

A one-unit lens drum 8 is secured to the four-unit lens drum 4 with a lead screw 4d and works the same as the four-unit lens drum 4 when performing the zooming operation.

A focusing operation ring 9 has a rectilinear groove 9a formed in its inner periphery and is rotatably fitted to the fixed drum 1. A protrusion 8a of the one-unit lens drum 8 is engaged with the above rectilinear groove 9a. Accordingly, when rotating the focusing operation ring 9, the 1-unit lens drum 8 moves along the optical axis A while rotating, thus effecting focusing.

FIG. 4 is a vertical sectional view illustrating a configuration of the interchangeable lens for the single-lens reflex camera shown in FIG. 3 when zoomed. As illustrated in FIG. 4, the interval between the two-unit lens drum 5 and the three-unit lens drum 6 changes in contrast with the case of FIG. 1, but an interval between the two-unit lens drum 5 and the spring receiving member 7, i.e., a length of the helical spring 10 does not change. Hence, the biasing force given by the helical spring 10 remains the same. The spring receiving member 7 receives the biasing force of the helical spring 10 with a cam mechanism (constructed of the cam groove 6b and the spring receptible interlocking pin 7a) provided on the three-unit lens drum 6, and, therefore, the helical spring 10 biases both of the two-unit lens drum 5 and the three-unit lens drum 6 in the directions opposite to each other.

According to the above-mentioned, the second lens unit L2 corresponds to a lens unit or a first lens unit as set forth in the appended claims. The third lens unit L3 corresponds to a second lens unit as set forth in the appended claims. Further, the two-unit lens drum 5 corresponds to a lens holding member or a first lens holding member as set forth in the appended claims. The three-unit lens drum 6 corresponds to a second lens holding member as set forth in the appended claims. Also, the helical spring 10 corresponds to a biasing member as set forth in the appended claims. Furthermore, the spring receiving member 7 corresponds to a biasing force receiving member as set forth in the appended claims. Moreover, the spring receptible interlocking pin 7a and the cam groove 6b constitute a biasing force adjustment cam mechanism as set forth in the appended claims.

Note that the present invention is not limited to the embodiments discussed above. The above embodiments are exemplifications but have substantially the same construction as the technical concept stated in the appended claims of the present invention, and every mode exhibiting the same operations and effects are included in the technical scope of the present invention.

For example, in accordance with the embodiments discussed above, there has been exemplified the lens barrel having only the driving mechanism for the zooming autofocusing. The present invention is not, however, confined to this lens barrel but may be applied to a lens barrel incorporating other mechanisms and functions, e.g., an autofocusing mechanism including a focusing lens unit.

Further, in accordance with the embodiments discussed above, the second lens unit L2 has been explained as the first lens unit as set forth in the appended claims while the third lens unit L3 has been explained as the second lens unit as set forth in the appended claims by way of examples. The two-unit lens drum 5 has been explained as the first lens holding member as set forth in the appended claims while the three-unit lens drum 6 has been explained as the second lens holding member as set forth in the appended claims by way of examples. The present invention is not, however, limited to those examples but may be used for other lens units and lens drums.

Moreover, in accordance with the embodiments discussed above, there has been exemplified such a construction that the helical spring 10 serving as the biasing member biases the lens units L2, L3. The present invention is not, however, confined to this construction but may be constructed so that the biasing member biases only the single lens unit.

Further, in accordance with the embodiments discussed above, there has been exemplified the helical spring as the compression spring by way of the example of the biasing member 10. The present invention is not, however, confined to this compression spring, but the helical spring may be used as a tensile spring, and other kinds of springs or other biasing members may also be employed. In short, there may be usable any kinds of springs disposed between the lens units and capable of making the biasing force act on each lens unit.

Furthermore, in accordance with the embodiments discussed above, the spring receiving member 7 provided on the three-unit lens drum 6 has been exemplified as the biasing force receiving member. The present invention is not, however, limited to this biasing force receiving member, and the biasing force receiving member may be any kinds of members provided on one of the first and second lens holding members and constructed to receive the biasing force of the biasing member.

In addition, according to the embodiments discussed above, there has been exemplified the biasing force adjustment cam mechanism constructed of the pin 7a attached to the spring receiving member 7 and the groove 6b formed in the three-unit lens drum 6. The present invention is not, however, confined to this mechanism. The biasing force adjustment cam mechanism may be constructed of the pin or the groove formed in the biasing force receiving member and the pin or the groove formed in the first or second lens holding member.

As described above, according to the present invention, when the movement cam mechanism moves the lens holding member, the biasing force adjustment cam mechanism moves the biasing force receiving member in the optical-axis direction so that the biasing force of the biasing member remains the same, and hence the movement cam mechanism is biased by the constant biasing force.

Further, according to the present invention, if the first movement cam mechanism moves the first lens holding member while the second movement cam mechanism moves the second lens holding member, the biasing force adjustment cam mechanism moves the biasing force receiving member in the optical-axis direction so that the biasing force of the biasing member remains the same, and hence the first and second movement cam mechanisms are biased by the constant biasing force.

What is claimed is:

1. A lens barrel comprising:
    a first lens holding member to hold a first lens unit;
    a second lens holding member to hold a second lens unit;
    a biasing force receiving member disposed between said first lens holding member and said second lens holding member and on a line that intersects said first lens holding member and said second lens holding member; and
    a biasing member disposed between said first lens holding member and said biasing force receiving member,
    wherein both said first and second lens holding members are movable along an optical axis direction in order to move said first and second lens units.

2. A lens barrel as claimed in claim 1, further comprising a first movement cam mechanism and a second movement cam mechanism that move said first and second lens holding members, respectively.

3. A lens barrel as claimed in claim 2, further comprising a biasing force adjustment cam mechanism for moving said biasing force receiving member in the optical axis direction so that the biasing force of said biasing member remains the same,
    wherein said biasing member biases said first and second lens holding members so as to shift slide allowances of said first and second movement cam mechanisms.

4. The lens barrel according to claim 3, further comprising:
    a cam ring engaged with said first movement cam mechanism, said second movement cam mechanism and said biasing force adjustment cam mechanism,
    said first lens holding member, said second lens holding member and said biasing force receiving member moving in the optical-axis direction with a rotation of said cam ring.

5. The lens barrel according to claim 4, wherein said biasing member has a helical spring, and
    said biasing force adjustment cam mechanism keeps said helical spring to a substantially fixed length by moving said biasing force receiving member in the optical-axis direction with the rotation of said cam ring and thereby keeps the biasing force of said helical spring constant.

6. The lens barrel according to claim 4, wherein said biasing force adjustment cam mechanism has a pin provided on said biasing force receiving member, a rectilinear groove formed in said cam ring and a cam groove formed in said lens holding member, and
    said pin engages with said rectilinear groove and said cam groove.

* * * * *